United States Patent
Chu

(10) Patent No.: US 8,296,095 B2
(45) Date of Patent: Oct. 23, 2012

(54) ELECTRONIC DEVICE AND METHOD FOR CONTROLLING STATE OF COMPONENTS THEREIN ACCORDING TO ANGLE BETWEEN COVER AND MAIN BODY THEREOF

(75) Inventor: Yung-Hung Chu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 341 days.

(21) Appl. No.: 12/756,199

(22) Filed: Apr. 8, 2010

(65) Prior Publication Data

US 2011/0015894 A1   Jan. 20, 2011

(30) Foreign Application Priority Data

Jul. 17, 2009  (CN) .......................... 2009 1 0304511

(51) Int. Cl.
*G01C 1/00* (2006.01)

(52) U.S. Cl. ..................................... 702/151

(58) Field of Classification Search .................. 702/151, 702/150, 182–185
See application file for complete search history.

(56) References Cited

U.S. PATENT DOCUMENTS

2009/0087134 A1*  4/2009  Martinez .......................... 385/12
* cited by examiner

*Primary Examiner* — Edward Raymond
(74) *Attorney, Agent, or Firm* — Altis Law Group, Inc.

(57) ABSTRACT

An electronic device includes a cover, a main body, a plurality of components, each has an on working state and an off working state respectively corresponding to an angle range, an angle measuring apparatus, a presetting unit to preset a relationship between the on and of working states of each component and corresponding angle ranges; a memory for storing the relationship as a table, an angle measuring unit to detect current angle value between the main body and the cover; a state determining unit to determine the angle range which the detected current angle value is in; a determining unit to determine whether a current working state of the components is same as the determined working state; and an updating unit to record the determined working state as an updated working state when they are not same.

9 Claims, 4 Drawing Sheets

ELECTRONIC DEVICE AND METHOD FOR CONTROLLING STATE OF COMPONENTS THEREIN ACCORDING TO ANGLE BETWEEN COVER AND MAIN BODY THEREOF

BACKGROUND

1. Technical Field

The disclosure relates to electronic devices, and particularly to an electronic device capable of controlling state of its components and a method for controlling state of components in the electronic device.

2. Description of Related Art

A touch switch is usually used in a notebook computer for changing working states of the notebook computer through the operation of opening and closing the lid of the notebook computer, for example, turning off the display screen or controlling the notebook computer to enter into a sleep mode. Mode-switching is often achieved via closing the lid to touch with main body of the notebook computer. However, a touch switch often has limited service life and can be easily damaged by repeated closings and openings of the lid.

Therefore, it is useful to provide an electronic device for controlling the state of components in the electronic device to overcome the above-mentioned shortcoming.

BRIEF DESCRIPTION OF THE DRAWINGS

The components in the drawing are not necessarily drawn to scale, the emphasis instead being placed upon clearly illustrating the principles of the electronic device.

DETAILED DESCRIPTION

Figure 1:
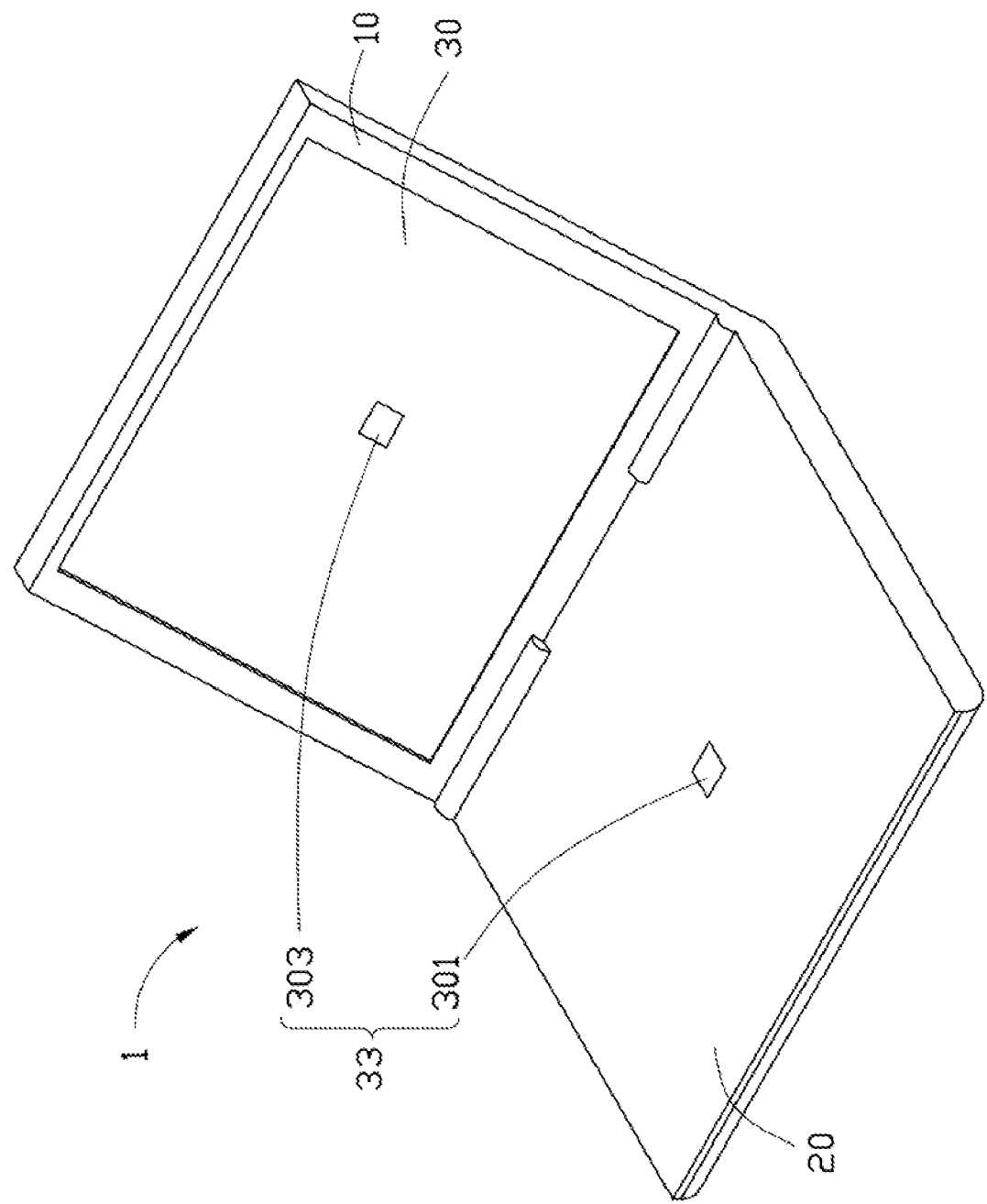
FIG. 1 is a schematic view of an electronic device in accordance with an exemplary embodiment.
Figure 2:
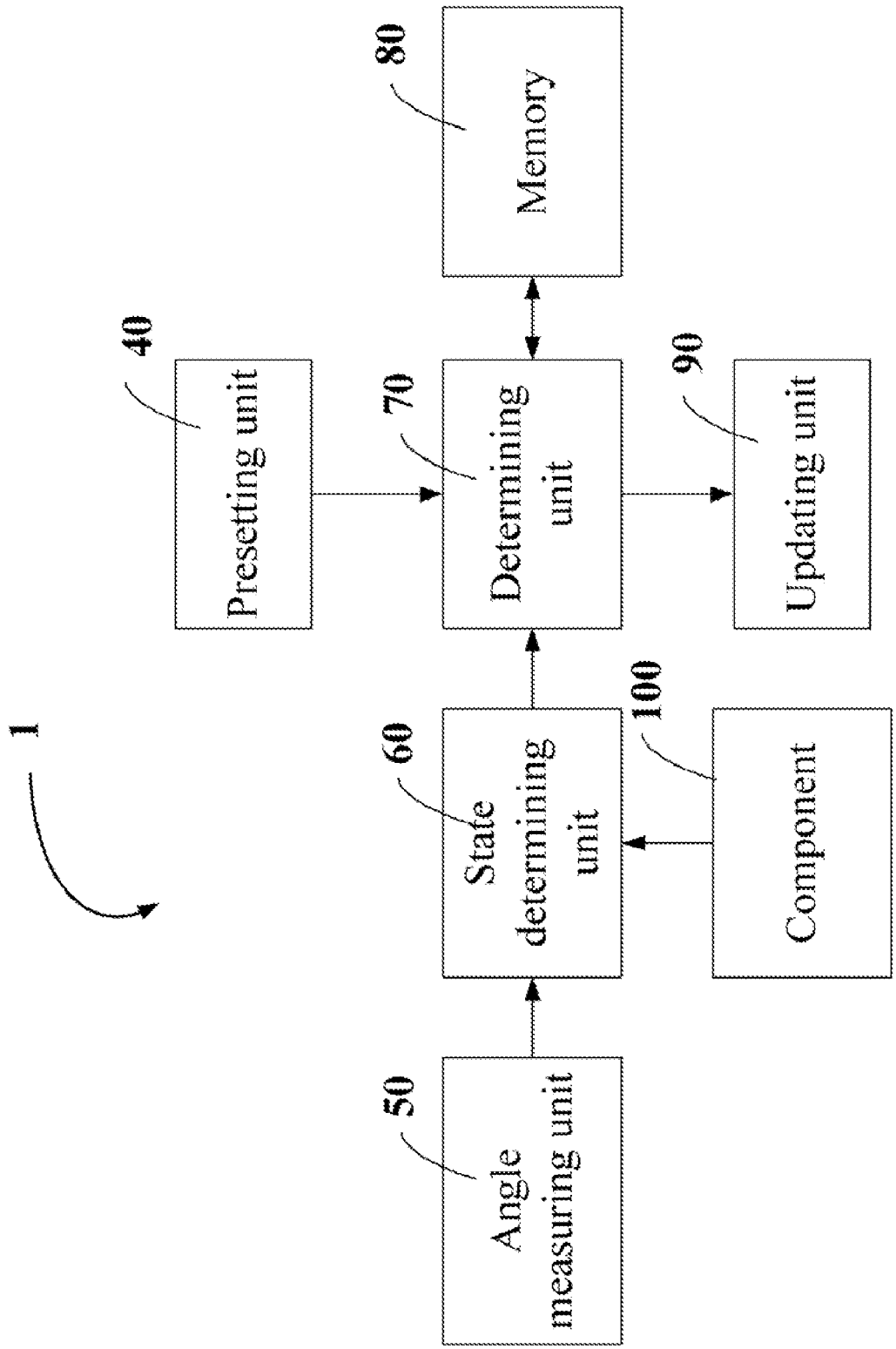
FIG. 2 is a block diagram of the electronic device in FIG. 1.
Figure 3:
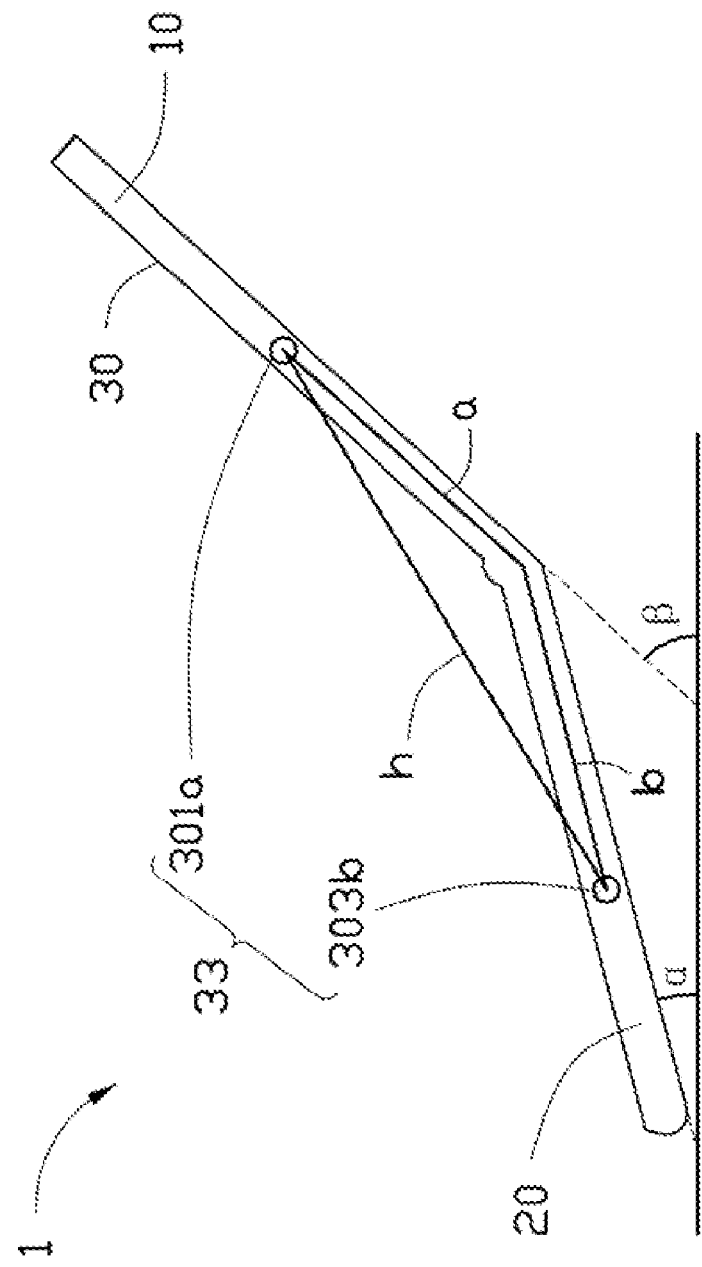
FIG. 3 is a schematic, cross-sectional view of the electronic device in FIG. 1.

Referring to FIGS. 1-3, the electronic device 1 includes a cover 10, a main body 20 connected with the cover 10, a screen 30 disposed on the cover 10. The electronic device 1 further includes an angle measuring apparatus 33 for measuring an angle value between the cover 10 and the main body 20 in real time. The angle measuring apparatus 33 may be disposed on the electronic device 1. The electronic device 1 may be any collapsible electronic device, such as a notebook computer, or a PDA.

The electronic device 1 further includes a presetting unit 40, an angle measuring unit 50, a state determining unit 60, a determining unit 70, a memory 80 and an updating unit 90.

The presetting unit 40 is configured for presetting relationship of switchable working states of components 100 in the electronic device 1 and corresponding angle ranges between the cover 10 and the main body 20. The components 100 of electronic device 1 may include a display screen, a CPU, or a keyboard. Each of the components 100 has two switchable working states: on and off. The memory 80 is used for storing a table recording the relationship of working states of components 100 in the electronic device 1 and corresponding angle ranges.

The following table uses the screen and the CPU for example to illustrate the present disclosure. For example, if the angle value between the cover 10 and the main body 20 is between the angle range of 30-40 degrees, the screen 30 will be shut off, and the CPU will be kept on, according to the table.

| Angle range | Screen | CPU |
|---|---|---|
| 0-30 | off | off |
| 30-40 | off | on |
| 40-60 | off | off |
| 60-135 | on | on |
| 135-180 | off | on |

The angle measuring unit 50 is configured to control the angle measuring apparatus 33 to detect a current angle value between the main body 20 and the cover 10. The state determining unit 60 is configured to determine the angle range where the detected angle value is, and thereby determine the working state of each of the components 100 of the electronic device 1 in the table.

The determining unit 70 is configured to control the components 100 of the electronic device 1 to work according to a current working state. The determining unit 70 is also configured to determine whether the current working state of the components 100 is the same as the determined working state in the table. If not, the determining unit 70 sends a control signal to the updating unit 90. For example, if the determined working state of the component is on, but the current working state of the component is off, then the determining unit 70 sends the control signal to the updating unit 90.

The updating unit 90 is configured to record the determined working state as the updated working state of each of the components 100 based on the control signal from the determining unit 70 when the current state of the component is different from the determined working state. The determining unit 70 is further configured to control the components 100 of the electronic device 1 to work according to the respective updated working states.

The angle value between the cover 10 and the main body 20 may be determined by following two ways. In the first way, the angle measuring apparatus 33 includes a first sensor 301 and a second sensor 303. The first sensor 301 is disposed on the main body 20 for sensing angle α between the main body 20 and ground. The second sensor 303 is disposed on the cover 10 for sensing angle β between the cover 10 and ground, thereby the value of angle θ is calculated by the angle α and the angle β. The first sensor 301 and the second sensor 303 may be G-sensors.

In the second way, the angle measuring apparatus 33 includes at least one infrared emitter 301a and at least one infrared receiver 303b. The following takes one infrared emitter 301a disposed on the cover 10 and one infrared receiver 303b disposed on the main body 20 for example. The infrared emitter 301a and one infrared receiver 303b are disposed on one cross-section. Distance h between the infrared emitter 301a and the receiver 302b can be measured, distance a between the infrared emitter 301a and an axis of an axle connecting the cover 10 and the main body 20 is predetermined when the infrared emitter 301a is disposed, and distance b between the infrared receiver 303b and the axis is predetermined when the infrared receiver 303b is disposed. The value of angle θ is calculated by a, b and h.

Figure 4:
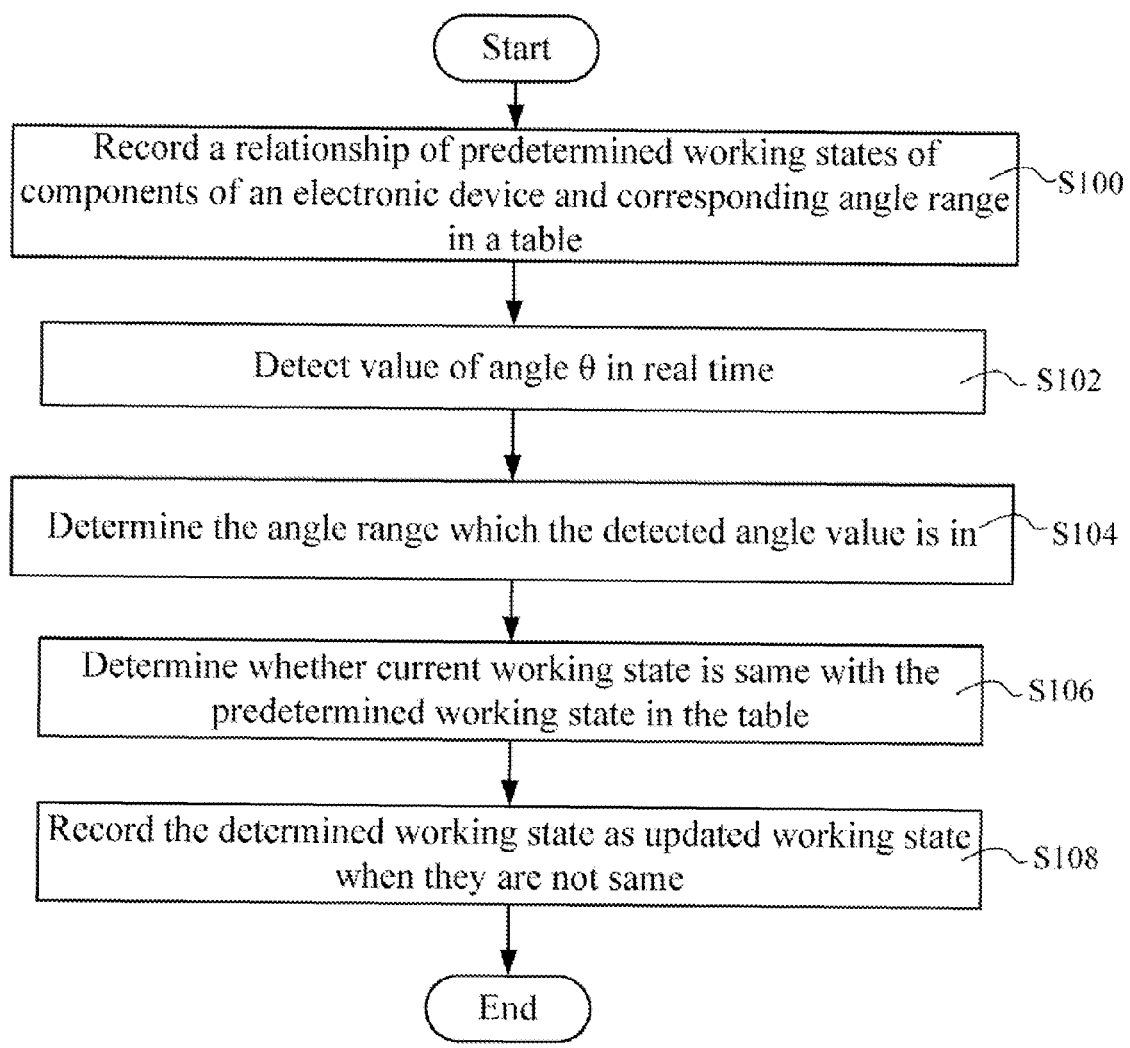
FIG. 4 is a method of controlling the electronic device in FIG. 1, in accordance with an exemplary embodiment.

FIG. 4 is a method of controlling the electronic device in FIG. 1. In step S100, the memory 80 records the relationship of the predetermined working states of components 100 in the electronic device 1 and corresponding angle range in the table by the presetting unit 40.

In step S102, the angle measuring apparatus 33 detects the value of angle θ in real time.

In step S104, the determining unit 60 determines the angle range which the detected angle value is in, and thereby determine the predetermined working state of components 100 of the electronic device 1 in the table.

In step S106, the determining unit 70 determines whether the current working state of the components 100 is the same as the determined working state in the table. If they are not the same, the determining unit 70 sends control signal to the updating unit 90. If they are the same, the determining unit 70 keeps the components 100 of the electronic device 1 to work according to current working state.

In step S108, the updating unit 90 records the determined working state as the updated working state of the components 100 when the current state of the components 100 are different from the determined working state. The determining unit 70 controls the components 100 of the electronic device 1 to work according to the updated working state.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. An electronic device comprising:
  a cover,
  a main body rotatably connected with the cover,
  a plurality of components received in the cover or the main body, wherein each of plurality of components has an on working state and an off working state, the on and off working states of each of the plurality of components respectively correspond to an angle range between the cover and the main body,
  an angle measuring apparatus to measure an angle between the cover and the main body,
  a presetting unit configured to preset a relationship between the on and of working states of each of the components and the corresponding angle ranges between the main body and the cover;
  a memory for storing the relationship as a table;
  an angle measuring unit configured to control the angle measuring apparatus to detect a current angle value between the main body and the cover;
  a state determining unit configured to determine the angle range which the detected current angle value is in, and thereby determining the corresponding working state of each of the components according to the table;
  a determining unit configured to determine whether a current working state of the each of the components is the same as the determined working state; and
  an updating unit configured to record the determined working state as an updated working state of each of the components when the current state of each of the components is different from the determined working state.

2. The electronic device of claim 1, wherein the angle measuring apparatus comprises a first sensor and a second sensor, the first sensor is disposed on the main body for sensing angle α between the main body and ground, the second sensor is disposed on the cover for sensing angle β between the cover and ground, thereby the current angle value is calculated by the angle α and the angle β.

3. The electronic device of claim 2, wherein the first sensor and the second sensor are G-sensors.

4. The electronic device of claim 1, wherein the angle measuring apparatus comprises one infrared emitter disposed on the cover, one infrared receiver disposed on the main body, and the infrared emitter and the infrared receiver are disposed on one cross-section, a distance h between the infrared emitter and the receiver is measured in real time, a distance a between the infrared emitter and an axis of an axle connecting the cover and the main body is predetermined when the infrared emitter is disposed, and a distance b between the infrared receiver and the axis is predetermined when the infrared receiver is disposed, and the current angle value is calculated by a, b and h.

5. A method for controlling an electronic device, the electronic device comprising a cover, a main body rotatable connected with the cover, and a plurality of components received in the cover or the main body, wherein each of plurality of components has an on working state and an off working state, the on and off working states of each of the plurality of components respectively correspond to an angle range between the cover and the main body, the method comprising:
  presetting a relationship of the working states of on and off between the one and off components and corresponding angle ranges between the main body and the cover;
  storing the relationship as a table;
  detecting a current angle value between the main body and the cover;
  determining the angle range which the detected current angle value is in, and thereby determine the working state of each of the components according to the table;
  determining whether the current working state of each of the components is the same as the determined working state; and
  recording the determined working state as the updated working state of each of the components when the current state of each of the components is different from the determined working state.

6. The method according to claim 5, wherein the method further comprises:
  controlling the components to turn on/off according to the respective updated working states using a determining unit of the electronic device.

7. The method according to claim 5, wherein the method further comprises:
  keeping the components to keep on/off according to the respective current working states when the current state of each of the components is the same as the determined working state.

8. The method according to claim 5, wherein the method further comprises:
  disposing a first sensor on the main body for sensing angle α between the main body and ground, a second sensor on the cover for sensing angle β between the cover and ground; and
  calculating the current angle value by the angle α and the angle β.

9. The method according to claim 5, wherein the method further comprises:
  disposing one infrared emitter on the cover, one infrared receiver on the main body such that the infrared emitter and the infrared receiver are on one cross-section;
  measuring a distance h between the infrared emitter and the receiver in real time;
  obtaining a distance a between the infrared emitter and an axis of an axle connecting the cover and the main body which is predetermined when the infrared emitter is disposed, and a distance b between the infrared receiver and the axis which is predetermined when the infrared receiver is disposed; and calculating the current angle value is by a, b and h.

* * * * *